March 3, 1936.  A. E. ANDERSON ET AL  2,032,968
WIRE CONNECTING DEVICE
Filed June 28, 1934   2 Sheets-Sheet 1
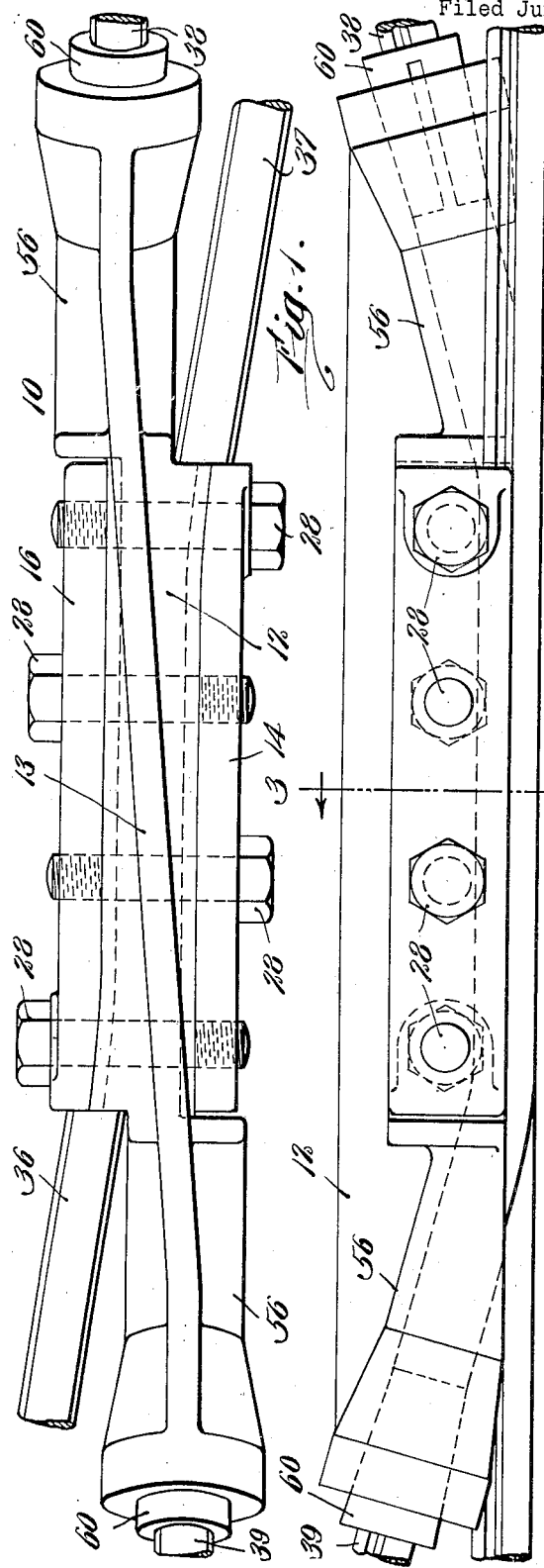
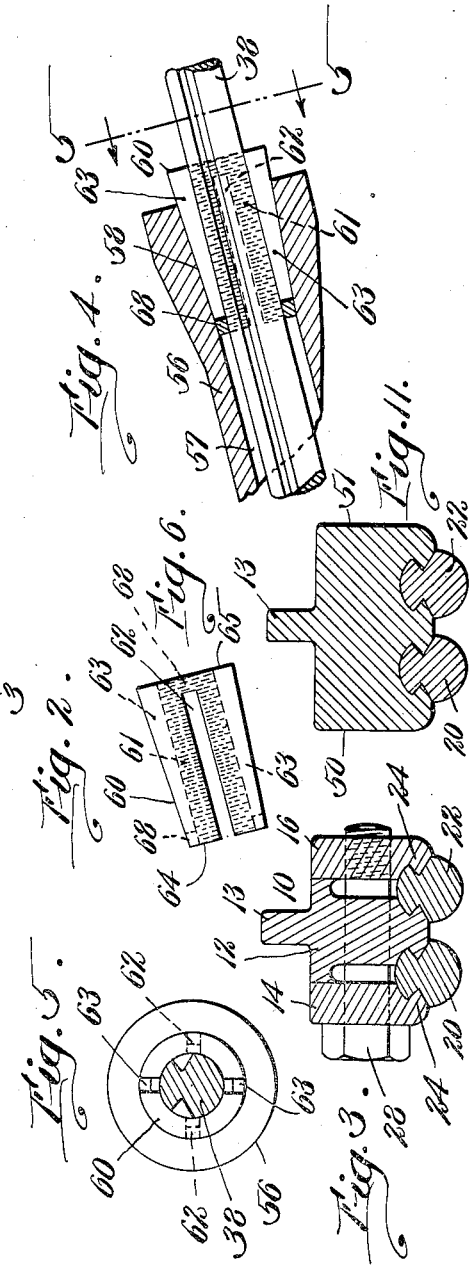
Inventors,
Alf E. Anderson
Charles H. Reynolds
by Jas. H. Churchill atty.

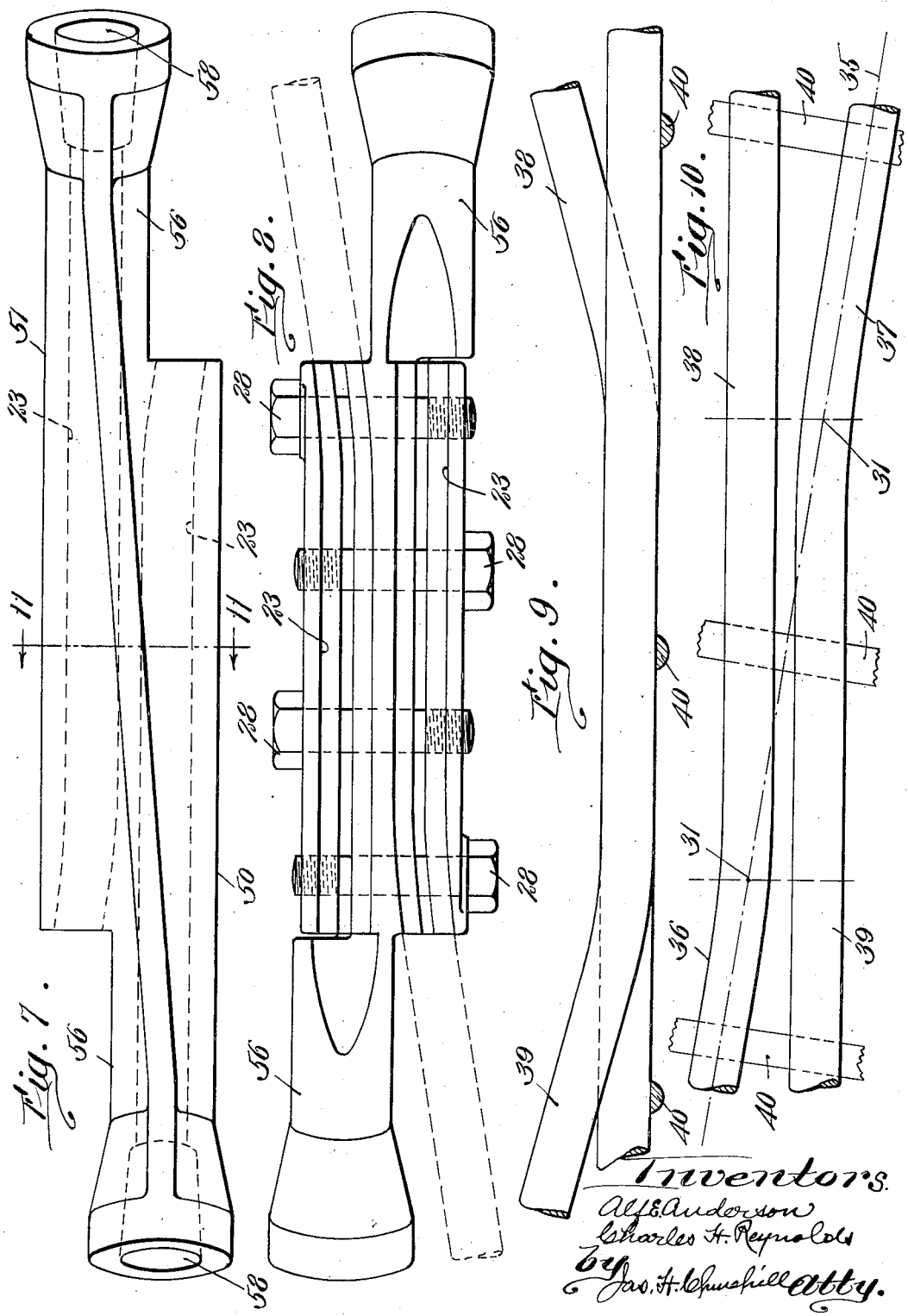

Patented Mar. 3, 1936

2,032,968

UNITED STATES PATENT OFFICE 2,032,968

WIRE CONNECTING DEVICE

Alf E. Anderson, Milton, and Charles H. Reynolds, Malden, Mass.; said Reynolds assignor to Albert and J. M. Anderson Manufacturing Company, South Boston, Mass., a corporation of Massachusetts Application June 28, 1934, Serial No. 732,896

11 Claims. (Cl. 191—44.1)

This invention relates to a wire connecting device, and more particularly to a trolley wire splicer.

The object of the invention is to provide a novel and improved connecting device, and more particularly a novel and improved trolley wire splicer, by which adjacent trolley wire sections may be secured together in a novel, efficient and secure manner and which is particularly designed for use in connection with high speed trolley systems.

With this general object in view and such others as may hereinafter appear, the invention consists in the connecting device and particularly in the trolley wire splicer hereinafter described and particularly defined in the claims at the end of this specification.

In the drawings illustrating the preferred embodiments of the invention, Fig. 1 is a plan of a trolley wire splicer embodying the invention; Fig. 2 is a side elevation of the same; Fig. 3 is a cross-section on the line 3—3 of Fig. 2; Fig. 4 is a sectional detail of one of the anchoring devices; Fig. 5 is a cross-sectional detail taken on the line 5—5 of Fig. 4; Fig. 6 is a detail in elevation illustrating a wedge forming a part of the anchoring device; Fig. 7 is a plan view of a modified form of the trolley wire splicer shown in Fig. 1; Fig. 8 is a bottom plan of the trolley wire splicer shown in Fig. 1; Figs. 9 and 10 are diagrammatic views in side elevation and plan, respectively, illustrating the positions in which the two ends of the trolley wire being spliced are maintained by the trolley wire splicer shown in both Figs. 1 and 7; and Fig. 11 is a cross-section on line 11—11 of Fig. 7.

In general, the present invention pertains to connecting devices for wires and the like, and more particularly to a splicer for sections of the trolley wires used in the high speed operation of cars and trains. One of the essential requisites for smooth operation at high speeds is that the trolley wire splicer serves to connect together the sections of the trolley wire to be spliced in such manner as to maintain the active portions of the trolley wire in alignment and without any break in the continuity of contact between the contact shoe and the trolley wires to thereby permit the contacting shoe to pass over the splice in a smooth uninterrupted manner and with minimum tendency toward diverting, bending or unduly straining the splice or the splicer.

In accordance with the present invention the improved trolley wire splicer is provided with an elongated body portion of bronze or other suitable material, and provision is made for securing the two sections of the trolley wire being spliced in fixed relation to the body portion and in a position in which the active portions of the trolley wires being spliced are maintained in accurate alignment so that the contacting shoe may pass from one section of trolley wire to the other with minimum resistance and in a smooth uninterrupted manner. In order to provide a most efficient and strong splice, provision is also made for anchoring the free ends of the trolley wire sections to the body portion in such manner that the tension in the trolley wire sections subjects the elongated body portion to compression. The body portion may and preferably will be provided with anchoring devices elevated with respect to the active trolley wire sections in order to remove the free ends of the trolley wires being spliced as well as the anchoring devices from the path of movement of the contacting shoe.

Referring now to the drawings, in Figs. 1, 2 and 8 I have illustrated one of the preferred forms of trolley wire splicer, and, as therein shown, 10 represents an elongated body portion which may be of bronze or other suitable material, provided with a central member 12 having a longitudinally extended web 13 to impart rigidity to the structure and side bars 14, 16 adapted to cooperate with the central member 12 to retain the trolley wire sections 20, 22 to be spliced in channels or grooves, indicated generally at 23, formed in the under surface of the body portion. These channels or grooves may and preferably will be shaped to provide retaining members 24 which fit into correspondingly shaped grooves in the sides of the trolley wires, this being the usual manner in which trolley wires have heretofore been held in prior trolley wire splicers. The side bars 14, 16 may be secured to the body portion 10 by a plurality of bolts 28 extended through and threaded into the side bars as illustrated in Fig. 1. While it is preferred to provide the body portion of the splicer with the channels 23 to retain the sections of the trolley wire being spliced, it will be understood that other forms of wire retaining means may be employed if found desirable.

In order to connect together the two sections of the trolley wire to be spliced, the wire retaining means is arranged so that each of the two trolley wire sections being spliced from each end of the body portion to points intermediate the length thereof are maintained in alignment and at such intermediate points are extended past one another in closely disposed and preferably in non-abutting relation whereby the portions of the trolley wire sections in alignment form in effect a continuous trolley wire section. The free ends of the trolley wire sections are anchored to the body portion in a manner such that the tension upon the trolley wire sections subjects the body portion to compression, thereby providing a construction of trolley wire splicer of maximum strength and durability and avoiding the liability of failure of the splicer by reason of breakage of the body portion under excessive tensile strains placed upon it by the trolley wire sections.

As herein shown, the channels 23 formed in the under surface of the body portion of the wire splicer are disposed in sweeping curves within the body portion and upon opposite sides of the longitudinal center axis thereof, as illustrated in Fig. 10. The channels are so disposed that each of the two trolley wire sections retained therein from each end of the body portion to points 31, 31 intermediate the length thereof are maintained in alignment as indicated by the axial line 35 in Fig. 10, such aligned portions of each section being indicated at 36 and 37 in Fig. 10. The free end portions of the two trolley wire sections indicated in Fig. 10 at 38, 39 are extended past one another in closely disposed relation and preferably in non-abutting relation, so that in operation the contact shoe of the trolley indicated at 40 may pass first in contact with the section 36 of one of the trolley wire sections and at an intermediate point in the length of the body portion, pass in contact with both trolley wire sections, and thereafter contact the remaining aligned section 37 of the second trolley wire section. The passage of the contact shoe 40 over the splice takes place in a smooth uninterrupted manner with minimum liability of distorting, bending or unduly straining either of the trolley wire sections.

In order to affix the free ends of the two sections of the trolley wire being spliced, it is preferred to provide the body portion with anchoring devices 50, 51 preferably formed integrally therewith, and arranged to register with the channels above referred to, so that each section of the trolley wire when assembled within the splicer is caused for the first portion of its entrance into the splicer to align with the corresponding portion of the other end of the second trolley wire section and then to pass out of alignment and be anchored within one of the anchoring devices. The arrangement of anchoring devices is such that the normal tension upon the two sections of trolley wire being spliced operates to place the elongated body portion under compression, thereby providing a most durable and strong construction of splice, and minimizing the liability of breakage of the connecting device by strains exerted upon it from the two trolley wire sections.

As illustrated in Figs. 4, 5 and 6, each anchoring device comprises a housing 56 having a hole 57 extended therethrough of a size sufficient to receive the trolley wire to be spliced, and the end portion 58 of the hole is arranged to taper as illustrated in Fig. 4, and is adapted to receive a wedge 60 preferably conical in shape and of the construction illustrated in Figs. 4, 5 and 6, by which the free end of the trolley wire is firmly anchored within the housing 56. The conical wedge 60 is provided with a threaded hole 61 extended therethrough, and with two sets of longitudinally extended slots 62, 63. One set of slots 62 is arranged to extend from one end 64 of the wedge to near the opposite end 65 thereof, and the second set of slots 63 is arranged to extend from the second end of the wedge to near the first end thereof whereby at each end portion of the wedge semi-circular retaining metal sections 68 are formed permitting contraction of the wedge in all directions when the latter is driven into the tapered hole in the end of the housing.

In anchoring the trolley wire sections in the anchoring devices, the free end of the trolley wire section is first passed outwardly through the housing 56, and thereafter the conical wedge is slipped over the end of the trolley wire section and driven into the tapered hole. The threads on the interior of the conical wedge form gripping devices and are forced into the metal of the trolley wire section to firmly anchor the same in the anchoring device. While it is preferred to utilize the illustrated construction of wedge and anchoring device, it is to be understood that other forms of anchoring devices may be used if found desirable.

In Fig. 7 a modified form of trolley wire splicer embodying the invention has been illustrated wherein the body portion 10 of the splicer is formed of a unitary structure with the anchoring devices 50, 51 integral therewith at each end thereof. The channels 23 are formed in the under surface of the unitary body portion in the manner illustrated in Fig. 7 and are disposed in the manner above described whereby each of the two trolley wire sections being spliced from each end of the body portion to points intermediate the length thereof are maintained in alignment and at such intermediate points are extended past one another in closely disposed relation and preferably in non-abutting relation to the end that when the contact member 40 passes over the splice it will pass from one aligned section to the other in a smooth uninterrupted manner. The free ends of the trolley wire sections are extended outwardly through the anchoring housings 56 and may be anchored in the manner above described, and as illustrated in Fig. 4, to the body portion, thereby causing the tension in the trolley wire sections to subject the body portion to depression.

While the preferred embodiments of the invention have been herein illustrated and described, it will be understood that the invention may be embodied in other forms within the scope of the following claims.

Having thus described the invention, what is claimed is:—

1. A wire splicer for trolley wires comprising a body portion provided with wire retaining means for retaining the two end sections of the trolley wires to be spliced, said wire retaining means having provision whereby each of the two trolley wire sections being spliced from each end of the body portion to points intermediate the length thereof are maintained in alignment, and at such intermediate points are extended past one another in closely disposed but non-abutting relation with their lower surfaces below the bottom of said body portion, the free ends of said trolley wire sections being anchored to the body portion whereby the tension in the trolley wire sections subjects the body portion to compression.

2. A wire splicer for trolley wires comprising a body portion provided with wire retaining means for retaining the two end sections of the trolley wires to be spliced, said wire retaining means having provision whereby each of the two trolley wire sections being spliced from each end of the body portion to points intermediate the length thereof are maintained in alignment, and at such intermediate points are extended past one another in closely disposed relation with their lower surfaces below the bottom of said body portion, the free ends of said trolley wire sections being anchored to the body portion whereby the tension in the trolley wire sections subjects the body portion to compression.

3. A wire splicer for trolley wires comprising a body portion provided with wire retaining means for retaining the two end sections of the trolley wires to be spliced, said wire retaining means having provision whereby each of the two trolley wire sections being spliced from each end of the body portion to points intermediate the length thereof are maintained in alignment, and at such intermediate points are extended past one another in closely disposed but non-abutting relation with their lower surfaces below the bottom of said body portion, anchoring means for each free end of said trolley wire sections, said anchoring means being disposed on opposite sides of the longitudinal axis of said body portion and extending upwardly from the plane of the trolley wire sections, whereby the tension in the trolley wire sections subjects the body portion to compression.

4. A wire splicer for trolley wire sections comprising a body portion provided with means for retaining the two end sections of the trolley wire to be spliced, and means for anchoring said end sections in a manner such that the tension in the trolley wires subjects the body portion to compression, said wire retaining means being arranged to maintain both trolley wire sections being spliced in alignment for a portion of the length of each engaged by said wire retaining means, and to permit said portions to extend past one another in closely disposed relationship with their lower surfaces below the bottom of said body portion.

5. A wire splicer comprising a body portion provided with channels on its under surface adapted to retain the two sections of the trolley wires to be spliced and open at their bottoms to enable said trolley wires to project below the bottom of said body portion, said channels being so disposed with relation to each other that the two trolley wire sections engaged thereby from each end of the body portion to points intermediate the length thereof are maintained in alignment and at such intermediate points are extended past one another in closely disposed but non-abutting relation with their lower surfaces below the bottom of said body portion, and means for anchoring the free ends of said trolley wire sections to the body portion in a manner such that the tension in the trolley wire sections subjects the body portion to compression.

6. A wire splicer for trolley wires comprising an elongated body portion having anchoring means disposed upon opposite ends thereof, side bars secured to the said body portion cooperating therewith to form wire retaining channels open at their bottoms, said channels being so disposed with relation to each other that the two trolley wire sections engaged thereby from each end of the body portion to points intermediate the length thereof are maintained in alignment and at such points are extended past one another in closely disposed relation with their lower surfaces below the bottom of said body portion and having the free ends of the trolley wire sections anchored by said anchoring means.

7. A wire splicer for trolley wires comprising a body portion provided with wire retaining means for retaining the two end sections of the trolley wires to be spliced, said wire retaining means being disposed in sweeping curves within the body portion and upon opposite sides of the longitudinal center axis thereof whereby each of the two trolley wire sections engaged by said retaining means from each end of the body portion to points intermediate the length thereof are maintained in alignment and at such points are extended past one another in closely disposed relation with their lower surfaces below the bottom of said body portion, the free ends of the trolley wire sections being anchored to the body portion whereby the tension in the trolley wire sections subjects the body portion to compression.

8. A wire splicer for trolley wires comprising a body portion provided with wire retaining means for retaining the two end sections of the trolley wires to be spliced, said wire retaining means being disposed in sweeping curves within the body portion and upon opposite sides of the longitudinal center axis thereof whereby each of the two trolley wire sections engaged by said retaining means from each end of the body portion to points intermediate the length thereof are maintained in alignment and at such points are extended past one another in closely disposed relation with their lower surfaces below the bottom of said body portion, and means for anchoring the free ends of the trolley wire sections in a manner such as to subject the body portion to compression.

9. A wire splicer for trolley wire sections comprising a body portion having channels open at their bottoms and extended lengthwise of the bottom of said body portion for the length of the same, said channels having the portions at the ends of said body portion in alignment and having portions intermediate the ends of said body portion out of alignment, and means for securing the sections of the trolley wire in said channels with the lower surfaces of said intermediate portions of said trolley wire sections below the bottom surface of said body portion.

10. A wire splicer for trolley wire sections comprising a body portion having channels open at their bottoms and extended lengthwise of the bottom of said body portion for the length of the same, said channels having portions at the ends of said body portion in alignment and having portions intermediate the ends of said body portion out of alignment, and housings extended upwardly from the ends of said body portion on opposite sides of the longitudinal axis of said body portion for the reception of the non-aligning portions of the trolley wire sections.

11. A wire splicer for trolley wire sections comprising a body portion having channels open at their bottoms and extended lengthwise of the bottom of said body portion for the length of the same, said channels having portions at the ends of said body portion in alignment and having portions intermediate the ends of said body portion out of alignment, and means for securing the trolley wire sections to said body portion with the bottom surfaces of the non-aligning portions of the trolley wire sections below the bottom of said body portion and in substantially the same horizontal plane.

ALF E. ANDERSON.
CHARLES H. REYNOLDS.